July 24, 1951 S. N. STRONG 2,562,070
HOPPER FOR PLANTER WITH BOTTOM DISCHARGE OPENING HAVING
ROTARY DISPENSER IN SAID OPENING AND CONVEYING ROLLERS
AND EJECTORS NEAR SAID DISPENSER
Filed March 9, 1946 3 Sheets-Sheet 1

INVENTOR.
Stanley N. Strong,
BY Morsell & Morsell
ATTORNEYS.

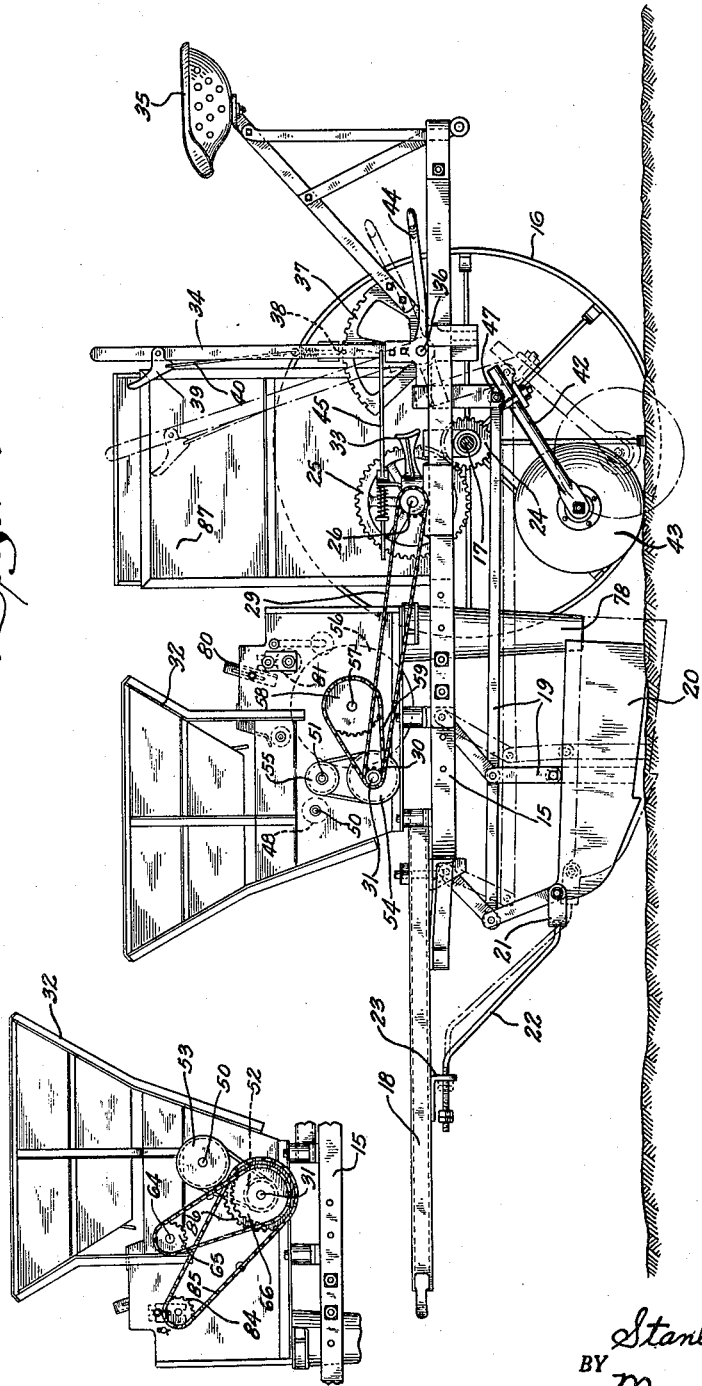

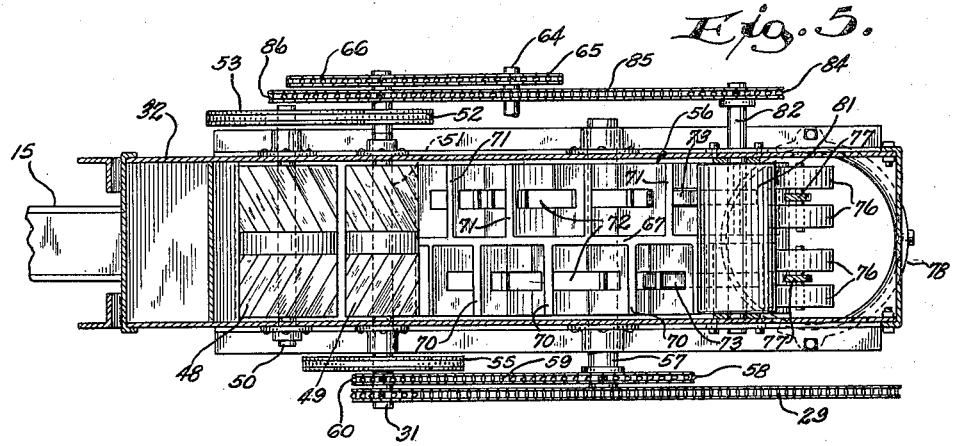

Patented July 24, 1951

2,562,070

UNITED STATES PATENT OFFICE 2,562,070

HOPPER FOR PLANTER WITH BOTTOM DISCHARGE OPENING HAVING ROTARY DISPENSER IN SAID OPENING AND CONVEYING ROLLERS AND EJECTORS NEAR SAID DISPENSER

Stanley Nelson Strong, Milwaukee, Wis., assignor to Rajo Motor Company, Racine, Wis., a corporation of Wisconsin Application March 9, 1946, Serial No. 653,281

3 Claims. (Cl. 222—177)

1

This invention relates to improvements in hopper for planter with bottom discharge opening having rotary dispenser in said opening and conveying rollers and ejectors near said dispenser.

Basically, potato planting follows the general practice employed in seed planting in that the ground is first broken or opened into a furrow by a plow or shoe and the seeds are then dropped into the furrow at proper intervals followed by the closing of the furrow by discs disposed rearwardly on the vehicle which carries the planting apparatus.

With respect to the planting of seed potatoes, which may be either small whole potatoes or cut eyed sections of large potatoes, a special problem is encountered because the seed elements materially vary in size, bulk and proportions. The primary aim in respect to planting potatoes is to insure the dropping of individual seed elements into the furrows at properly spaced intervals. In the available mechanical potato planters, selective feeders are employed for the purpose of transferring the seed elements from the planter hopper to the seed spout for spaced individual deposit into the furrows. However, in the conventional mechanisms, due to the fact that the seed potatoes or elements reaching the selective feeder are uneven as to size and proportions, frequently various pockets or compartments in the selective feeder will draw blanks with the result that there will be improper spacing of the seed elements in the furrows and certain of the hills will be empty because of the absence of seed elements therefrom.

With the foregoing in mind, it is a primary object of the present invention to eliminate the difficulties and objections inherent to conventional mechanical potato planters by providing an improved potato planter wherein the mechanism assures the proper loading of the pockets or compartments of the selective feeder so that not any of the same will be blank, with the result that during rotation of the selective feeder seed elements will be dropped into the furrow successively from each selective feeder compartment whereby the furrows will be filled with seed elements disposed at proper uniform intervals.

A further object of the invention is to provide, in a mechanical potato planter wherein a compartmental selective feeder is adapted to be filled with seed potatoes or seed elements gravitating from a hopper, improved means within the hopper which serve to constantly keep the seed potatoes or seed elements "floating" or agitated to facilitate the travel of a stream of normal, properly

2 sized seed potatoes or elements toward and into pockets of the selective feeder wheel, whereby all of the pockets or compartments of the selective feeder wheel are filled and utilized so that there will be proper successive and spaced discharge of seed elements therefrom into the furrows.

A further object of the invention is to provide, in a mechanical potato planter, an efficient selective feeder wheel having cooperating therewith means for positively ejecting each seed element from its compartment in the wheel at a definite position with reference to the rotation of the wheel, whereby successive seed elements are dropped into the furrow in proper relationship to assure the desired spacing of the seed elements in the soil.

A further object of the invention is to provide, in a mechanical potato planter having a large bulk seed element holding hopper, a plurality of specially formed and particularly spaced rollers designed to facilitate the travel of normally sized and shaped seed potato elements out of the bulk toward the selective feeder wheel and preventing jamming of said elements adjacent the entrance to the selective feeder wheel to limit the number of seed elements which can enter the wheel compartments at any particular time.

A further object of the invention is to provide in a mechanical potato planter, a selective feeder wheel formed with cups or compartments arranged in special relationship around its circumference and of a size and shape to facilitate the reception and retention of seed potato elements to the point of ejection.

A further object of the invention is to provide, in a mechanical potato planter of the character described, a restricted, regulatable distributor compartment over the top peripheral portion of the selective feeder wheel adapted to have disposed therein a limited number of potato seed elements and functioning to fill therefrom any occasional compartments in the selective feeder wheel which fail to pick up a seed element from the normal filling position.

A further object of the invention is to provide, in a mechanical potato planter of the character described, a distributor roller disposed within the previously mentioned distributor compartment and in proximity to a top peripheral portion of the selective feeder wheel, said roller functioning to permit the passage therebeyond of a properly filled cup or compartment of the wheel, but operating to "scuff back" the upper seed element in the event that a seed compartment comes into proximity with the roller containing more than one seed element, forcing the extra removed seed element back into the distributor compartment to await an empty cup or compartment.

A further object of the invention is to provide, in a mechanical potato planter of the character described, retainer members cooperating with the selective feeder wheel to prevent premature gravitation of seed elements out of the wheel compartments before the correct ejection station is reached.

A further object of the invention is to provide a mechanical potato planter in which the moving mechanism is automatically driven from the wheel carrying axle of the vehicle on which the planting mechanism is mounted, which is automatic and efficient in operation, which is strong and durable, which is relatively inexpensive, and which is well adapted for the purposes described.

With the above and other objects in view, the invention consists of the improved mechanical potato planter and its parts and combinations as set forth in the claims, and all equivalents thereof.

In the accompanying drawings in which the same reference characters indicate the same parts in all of the views:

Fig. 2 is a side view thereof on a slightly larger scale with the wheel-carrying axle being shown in section;

Fig. 3 is a fragmentary view showing the seed element hopper from the opposite side of that shown in Fig. 2 with the associated drive and supporting members;

Fig. 4 is an enlarged fragmentary vertical sectional view through that portion of the machine which includes the seed element hopper, the selective feeder wheel, the discharge spout, and the associated members and mechanisms;

Fig. 5 is a fragmentary horizontal sectional view taken on line 5—5 of Fig. 4;

Fig. 7 is a fragmentary detail sectional view taken on line 7—7 of Fig. 4; and

Figure 1:
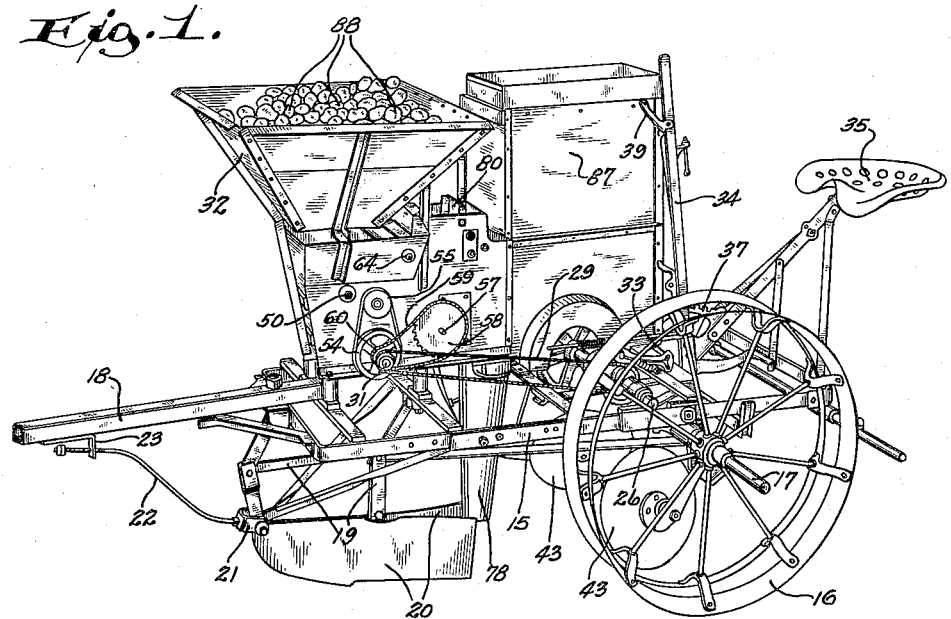
Fig. 1 is a front and side perspective view of the improved wheeled potato planter.

Referring now more particularly to the drawings, it will appear that the improved mechanical potato planter is embodied in a wheeled agricultural vehicle which includes a frame or chassis 15 supported on a pair of large diameter wheels 16 which are mounted fast on a revolubly journalled axle 17. Extending forwardly from the chassis 15 is a tongue or bolster 18 which is adapted to be hitched or connected to a pulling vehicle such as a tractor.

Depended from the chassis 15, through a series of supported and pivotally connected links and levers, indicated generally by the numeral 19, are a pair of rearwardly diverging plow or shoe elements 20 which, when in proper lowered adjusted position, are adapted to form furrows in the soil over which the wheeled implement travels. It will be observed that the forward ends of the plow elements 20 and the adjacent connected portion of the linkage 19 pivotally carry a clevis 21 from which extends forwardly an angular rod 22 whose threaded outer end is adjustably engaged in a bracket 23 on the underside of the bolster 28. Adjustments of the rod 22 raise and lower the plow elements 20 for the purpose of regulating the depth of the furrows formed.

Figure 8:
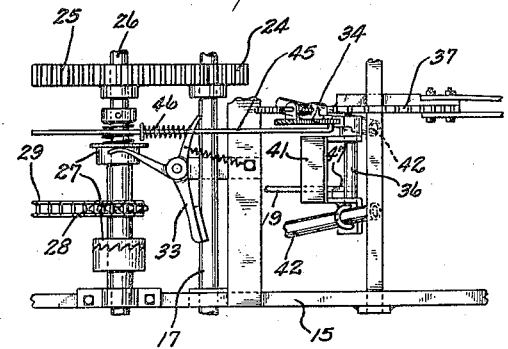
Fig. 8 is a fragmentary detail sectional view looking down on the rear portion of the machine chassis to show the power take-off mechanism, drives and controls.

The revoluble axle 17 serves as the source of power for the various moving instrumentalities in the potato planter mechanism to be described in detail hereinafter. One end of the rear axle carries fast thereon a small gear 24 which meshes with a large gear 25 on the same end of a clutch controlled shaft 26 mounted in the chassis forwardly of and parallel to the rear axle 17. Fast on a portion of the shaft 26 which can be engaged or disengaged relative to the positively driven shaft portion of the shaft 26 through a clutch 27, is a sprocket 28 engaged by an endless chain 29. Said chain extends forwardly to a sprocket 30 which is fast on a stud shaft 31 which is journalled in suitable bearings in the lower portion of a seed element hopper 32. As will appear hereinafter, power is taken off of the stud shaft 31 to drive certain rollers within the hopper 32 and a selective feeder wheel. The driven portion of the shaft 26 may be disengaged from the driving portion of said shaft in the event of an emergency whereupon a pivotally mounted foot lever 33 is operated to throw out the clutch which will then discontinue the drive to the stud shaft 31. However, normal operation of the clutch 27 in the control shaft 26, as well as manipulation of other elements in the assembly is accomplished by means of a hand lever 34. It will be observed that an operator's seat 35 is mounted at an elevation relative to the chassis over the rear end of the same. The control lever 34 is disposed forwardly of the operator's seat and its lower end is pivotally mounted on a stud shaft 36 adjacent which there is a fixedly mounted ratchet member 37 to be releasably engaged by a spring urged pawl 38 controlled by a movable handle member 39 on the upper end of the hand lever 34, through a rod 40. The operating lever 34 is adapted to turn with the stud shaft 36 on which there is mounted fast a bracket 41 (see Fig. 8) having depending side arm portions to which are anchored the upper extremities of spaced arms 42 which carry at their lower ends spaced discs 43 which function to close the furrows formed in the soil after the said planting operation. As shown in Fig. 2, there may be integral with the hand lever 34 a rearwardly extending foot treadle 44 which may be operated through the foot of the occupant of the seat 35 so that the controls afforded by the lever 44 may be hand or foot operated, or both.

In connection with the lever 34, it should be noted that there is attached to the lower end thereof a forwardly projecting rod 45 which is yieldably associated with the clutch operating foot pedal 33 with the result that upon manipulation of the hand lever 34, after a certain range of freedom of movement, provided by the spring 46 on the rod 45, through the engaging end of the foot pedal 33 the clutch for the controlled shaft 26 will be operated.

The handle 34 is also effective to raise and lower the adjusted plow elements 20 relative to the soil. This is accomplished because the rear end of the top elongated member of the linkage 19 is pivotally connected to a side strap of the bracket 41, as at 47. Hence, a movement of the lever 34 in one direction is effective to accomplish disengagement of the clutch 27 in the controlled shaft 26 to discontinue the drive to the elements in the hopper 32, to raise the front plow elements 20, and to raise the furrow covering discs 43. A reverse movement of the lever 34 is effective to engage the drive to the movable elements in the hopper, to lower the plow elements 20 into the ground so as to form furrows, and to lower the discs 43 to operative position. Of course, there are intermediate positions of adjustment.

Referring particularly to Fig. 4, it will be noted that the hopper 32 is in fact a relatively large capacity container and intermediate the top and bottom thereof a floor is formed by a pair of transverse rollers 48 and 49 respectively, mounted fast on shafts 50 and 51, respectively journalled in side wall portions of the hopper. As shown, the rollers 48 and 49 have fluted surface portions arranged in herringbone formation. Also, the roller 48 is of a diameter substantially greater than the roller 49, but both rollers revolve in the same direction. In this connection, it is to be observed from Figs. 1, 2 and 5 that the driven shaft 31 carries on the side shown in Fig. 3 a pulley 52 which is in belted connection with a pulley 53 on the shaft 50 of the roller 48. On the side of the hopper 32 shown in Fig. 2, the end of the shaft 31 there appearing, carries a pulley 54 which is in belted connection with a pulley 55 on the shaft of the roller 49. The driving arrangements for the rollers 48 and 49 is such that the roller 49 will be driven at a higher rate of speed than the roller 48. Due to the differences in circumference of the rollers 48 and 49, the top surface of the latter roller is somewhat below that of the roller 48. Also, roller 49 operates in spaced but close proximity to the open cup peripheral portions of a revoluble selective feeder wheel 56 which will be described more in detail hereinafter. At this point it will suffice to state that said feeder wheel forms a revolving closure for the front portion of the lower compartment of the hopper 32 and is mounted fast on a suitably journalled transverse shaft 57. An outer end of the latter, on the side of the lower hopper container shown in Figs. 1 and 2, carries fast a sprocket 58 which is connected by an endless chain 59 with a sprocket 60 fast on the driven shaft 31.

Substantially below the open top of the hopper 32 an interior rear wall thereof carries a downwardly forwardly directed baffle 61 which directs lower seed potatoes disposed in the upper portion of the hopper, as shown in Fig. 1, toward the revolving rollers 48 and 49. The revolving rollers 48 and 49, in their particular relationship, serve to keep the seed potatoes or seed elements within the hopper more or less "floating" or agitated whereby a stream of smaller or properly sized seed elements may be tossed, agitated and directed toward the adjacent compartments in the selective feeder wheel 56. The more rapidly rotating roller 49, and on a lower level, serves to spread or separate the potatoes which it contacts to position the same properly for reception by the pockets of the wheel 56.

Projecting into the front of the hopper 32 is an angled baffle plate 62 under the free lower flange of which is positioned a transverse revoluble agitating roller 63 fast on a properly journalled shaft 64. Only the rear surface of the roller 63 is exposed to the seed elements in the hopper and said roller serves a dual function in respect to keeping the load light to prevent seed elements from jamming at the entrance to the compartmental feeder wheel 56, and said roller 63 also serves to limit or restrict the number of seed elements which can at any one time, enter the compartments of the feeder wheel 56, due to the fact that the lower peripheral portion of the roller 63 is travelling in a direction reverse to that of the upper peripheral portion of the feeder wheel 56. As shown best in Fig. 3, an end of the shaft 64, which carries the roller 63, has fast thereon a sprocket 65 which is connected by an endless chain with a sprocket 66 fast on the driven shaft 31.

Figure 6:
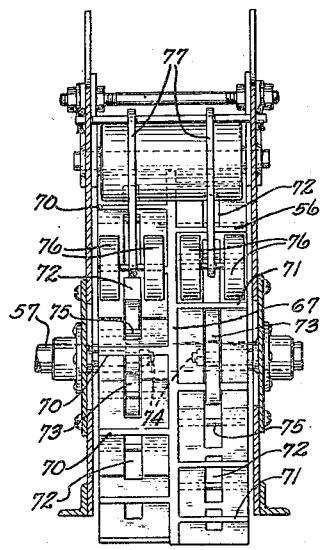
Fig. 6 is a fragmentary vertical sectional view taken on line 6—6 of Fig. 4 to show the compartmental selective feeder wheel.

The formation of the selective feeder wheel 56 can best be understood by referring to the detailed illustrations thereof in Figs. 4, 5, 6 and 7. Essentially, it is formed of a casting having a central disc 67 with an inner hub ring 69 projecting equally laterally on both sides thereof. Integral with the hub 69 there are, on each side of the central disc 67, a series of outwardly projecting wall flanges 70 and 71, respectively, it being noted that the flanges 70 on one side of the central disc 67 are staggered with reference to the flanges 71 on the other side of the central disc 67, with the result that two series of tapered compartments or pockets are provided in the wheel 56 with the pockets on one side of the center disc being in staggered relation to the pockets on the other side of the center disc. The sheet metal sides of the hopper 32 close the outer sides of the pockets. In the hub 69, forming the bottom wall of all of the pockets, is milled for each pocket an elongated slot 72 which are for the purpose of having projected therethrough at the proper point of movement of the wheel 56 toward its seed ejecting station, the projections of spaced star wheels 73. As is shown in Fig. 6, one star wheel 73 is positioned for registration with the wheel compartments on one side of the central disc 67 and the other star wheel 73 is positioned for registration with the compartments on the other side of the central disc 67. Both star wheels are mounted on alined axes formed by stud shafts 73 projecting inwardly from the side plates of the hopper 32. Within the bottom wall of each compartment of the wheel 56 so as to traverse the slot 72 therein, is a pin 75. During rotation of the feeder wheel 56, at the proper time, the compartment pins 75 engage the projecting portions of the star wheels 73 and move the same relative to the wheel 56 so that a projection of a wheel 73 moves substantially through a slot 72 into a wheel pocket to eject a seed element therefrom.

From the description thus far given, it should be apparent that the selective feeder wheel 56 is being turned in the direction indicated by the arrow in Fig. 4. The staggered compartments, whose open ends are exposed between the rollers 49 and 63 in the hopper 32, are each filled with an individual seed potato or element, each compartment being of a size to snugly receive a single ordinary sized seed element. As the pockets thus filled revolve away from the seed introducing station, the outer front peripheral portion of the feeder wheel 56 comes into frictional contact with a series of rollers 76 which are revolubly depended in pairs from pivotally mounted straps 77 carried by an upper frame element. Said rollers 76 serve to block the mouths of the compartments in the feeder wheel 56 to prevent gravitation of seed elements therefrom until the compartments reach the proper ejecting level. The latter is illustrated in Fig. 4 wherein the pocket entered by a projection of the star wheel 73 has a seed element ejected therefrom.

Mounted on the forward lower portion of the hopper compartment within which the wheel 56 revolves, is a hollow seed spout 78 depending substantially below the chassis 15 of the implement with its open discharge end positioned between the diverged extremities of the plow shoes 20. The result of this arrangement is that during rotation of the selective feeder wheel 56 there is a timed ejection of seed elements from the compartments of the wheel with such ejection being staggered with reference to the two laterally separated compartmental wheel sections. The successively ejected seed elements gravitate into the seed spout 78 and are disposed thereby singly and in proper sequence in the furrow dug by the plow shoes 20, whereupon the discs 43 function to shovel the dirt back over the furrow and to enclose the successively planted seed elements in the furrow.

The upper forward portion of the container or bin immediately over the top peripheral portion of the feeder wheel 56 is formed as an auxiliary seed compartment 79, and within the forward portion thereof is an adjustably mounted baffle plate 80 (see Fig. 4). It is intended that this auxiliary compartment 79 be kept loaded with a limited number of seed potatoes or elements which are confined between the roller 63, the adjustable baffle 80 and a lower auxiliary distributor roller 81. It occasionally happens, during the movement of the feeder wheel 56, that it will pass the normal loading station adjacent the roller 49 with the filling of a compartment being missed. Hence, the auxiliary compartment 79 functions to cause the deposit of seed elements into any compartments of the wheel 56 which have been originally missed.

The auxiliary distributor roller 81 is mounted fast on a transverse shaft 82 journalled in an adjustable bearing 83. One end of the shaft 82 projects laterally of a side of the hopper and carries a sprocket 83 which is connected by an endless chain 85 with a sprocket 86 on the driven shaft 31. The auxiliary distributor roller 81 is positively driven thereby in the direction indicated by the arrow in Fig. 4. This roller 81, due to its adjustable bearing 83, is set, with reference to the perimeter of the feeding wheel 56, so that it permits the wheel to freely pass therebelow if the adjacent compartments are properly filled with single seed elements. However, should the adjacent compartments be overloaded with additional seed elements, the same project outwardly and are scuffed out of the compartments into the auxiliary seed element compartment 79 by the roller 81. This prevents undesirable "double plantings." There is a desirable exception, however, and that is when a compartment of the wheel 56 arrives adjacent the auxiliary roller 81 and contains two unusually small elements. Then, the compartment so loaded may freely pass below the wheel 81 and a "double planting" will result with respect to the small seed elements and this is considered to be desirable where the seed elements constituting a "double planting" are unusually small.

There is mounted on the chassis 15 immediately rearwardly of the seed spout 78, the hopper 32, and the mechanism associated therewith, an upstanding fertilizer bin 87. The bottom of said bin has regulatable means for permitting fertilizer to fall from the bin over the planted rows traversed by the implement.

In the use of the improved mechanical potato planter the tongue or bolster 18 is connected to a forwardly disposed tractor or other source of motive power and is thereby pulled across the field which is to be planted with potatoes. An adequate supply of seed potatoes 88 or potato seed elements are disposed in the large capacity hopper 32. When the implement is set into motion, the turning of the supporting wheels 16 will revolve the axle 17 from which the power is taken off to the various moving instrumentalities previously described. When it is desired to have the planter function, the operator, seated on the seat 35, will adjust the levers 34 to the proper position to cause the plow shoes 30 to engage the ground to form a furrow of the desired depth. With the lever thus positioned, the clutch 27 in the control shaft 26 will be engaged and the drives to all of the rollers and to the selective feeder wheel 56 will be operative so that said members will be in motion. In the bulk of seed potatoes within the hopper 32, it will be found that the elements vary in size and proportions and the revolving rollers 48 and 49 serve to keep the bulk of seed elements agitated and said rollers, in conjunction with the rollers 63, operate to permit a flow of properly sized seed elements to the loading station of the wheel 56 at which station the staggered pockets or compartments in the wheel 56 are correctly loaded with properly sized seed elements. As the wheel 56 turns in the direction indicated, the filled pockets thereof register with the auxiliary compartment 79 whereupon any missed pockets are automatically filled, following which the auxiliary roller 81 serves to scuff off the seed elements from overloaded pockets. At the proper point on the downside of the wheel 56, the star wheel ejectors function to successively discharge seed potatoes from the staggered pockets on both sides of the wheel, providing a properly timed stream of single potatoes discharged into and through the spout 78 for properly spaced planting in the formed furrow, without any objectionable skips or irregularity in spacing. Thereupon, the discs 43 function to close the furrows and the fertilizer is deposited along the line of planting.

With respect to the improved mechanical seed planter, it should be emphasized that the fluted rollers 48 and 49, in their properly spaced relationship, and with the same being of different diameters and operating at different speeds, function to select out of the agitated bulk of seeds within the hopper a stream of seed potatoes of the desired average size and introduce the seed potatoes thus separated from the bulk into a favorable position with reference to the loading station of the selective feeder wheel 56. The latter is novel in the arrangement of the peripheral staggered pockets, and cooperating with the feeder wheel 56 are the means of overcoming "misses" in the original pocket loading zone and overcoming overloading. The ejector wheels 73 then insure positive ejection of the seed elements from their pockets for uniform planting.

Heretofore, with respect to mechanical potato planters, the skips or misses have been so great as to materially detract from the efficiency of the machines to the extent that some machines only show from 50 to 80% actual efficiency and the plantings are irregular. With respect to the present mechanical potato planter, tests have established that the same has an efficiency of about 99%.

From the foregoing description it will be seen that the improved mechanical potato planter is subject to adjustment and regulation to suit conditions, is automatic in its operation, performs ex-

What is claimed as the invention is:

1. A mechanical planter, comprising a vehicular frame adapted to be pulled over a field, a hopper mounted on the frame and containing a mass of non-uniform seed elements, the lower portion of the hopper being constricted and having a loading station, a rotary feed wheel formed with peripherally opening staggered pockets and mounted relative to the hopper so that a limited peripheral portion projects thereinto in registration with the loading station, driven rollers forming a floor of the hopper to agitate the mass of seed elements therein and to direct toward the pockets of the feed wheel thereadjacent a restricted stream of seed elements selected from the mass and which are of average size relative to those constituting the mass, and automatically operating rotary ejectors associated with the feed wheel and entering filled pockets on the forward side thereof to positively eject seed elements, the ejectors being on an axis parallel to that of the rotary feed wheel.

2. A mechanical planter, comprising a vehicular frame adapted to be pulled over a field, a hopper mounted on the frame and containing a mass of non-uniform seed elements, the lower portion of the hopper being constricted and having a loading station, a rotary feed wheel formed with peripherally opening staggered pockets and mounted relative to the hopper so that a limited peripheral portion projects thereinto in registration with the loading station, driven rollers forming a floor of the hopper to agitate the mass of seed elements therein and to direct toward the pockets of the feed wheel thereadjacent a restricted stream of seed elements selected from the mass and which are of average size relative to those constituting the mass, feed wheel pocket covers swingably depended so as to cover pockets on the forward side of the feed wheel, and automatically operating rotary ejectors associated with the feed wheel and entering filled pockets on the forward side thereof below the covers to positively eject seed elements, the ejectors being on an axis parallel to that of the rotary feed wheel.

3. A mechanical planter, comprising a vehicular frame adapted to be pulled over a field, a hopper mounted on the frame and containing a mass of non-uniform seed elements, the lower portion of the hopper being constricted and having a loading station, a rotary feed wheel formed with peripherally opening staggered pockets mounted relative to the hopper so that a limited rear peripheral portion projects thereinto in registration with the loading station, driven rollers forming a floor of the hopper to agitate the mass of seed elements therein and to direct toward the pockets of the feed wheel thereadjacent a restricted stream of seed elements selected from the mass and which are of average size relative to those constituting the mass, feed wheel pocket covers swingably depended so as to cover pockets on the forward side of the feed wheel, and automatically operating rotary ejectors associated with the feed wheel and entering filled pockets on the forward side thereof below the covers to positively eject seed elements, the axis of the ejectors being parallel to that of the feed wheel.

STANLEY NELSON STRONG.

REFERENCES CITED

The following references are of record in the file of this patent:

UNITED STATES PATENTS

| Number | Name | Date |
| --- | --- | --- |
| 19,294 | Hawley | Feb. 9, 1858 |
| 149,278 | Couteau | Mar. 31, 1874 |
| 149,545 | Thomas et al. | Apr. 7, 1874 |
| 190,944 | Williams | May 15, 1877 |
| 976,292 | Reid | Nov. 22, 1910 |
| 1,061,490 | Pauly | May 13, 1913 |
| 1,168,859 | Compton | Jan. 18, 1916 |
| 1,220,684 | Ray | Mar. 27, 1917 |
| 1,396,900 | Tworsky | Nov. 15, 1921 |
| 1,405,001 | Reichelt | Jan. 31, 1922 |
| 1,452,912 | Hartenstein | Apr. 24, 1923 |
| 1,959,561 | Artrip | May 22, 1934 |
| 2,363,961 | Hart | Nov. 28, 1944 |
| 2,475,381 | Erickson | July 5, 1949 |

FOREIGN PATENTS

| Number | Country | Date |
| --- | --- | --- |
| 58,461 | Austria | Nov. 15, 1912 |
| 311,755 | Germany | May 7, 1918 |